O. E. BARTHEL.
PISTON.
APPLICATION FILED AUG. 31, 1914.

1,224,999.

Patented May 8, 1917

Witnesses
Chas. W. Stauffiger
Anna M. Dorr.

Inventor
Oliver E. Barthel,
By
Attorney

UNITED STATES PATENT OFFICE.

OLIVER E. BARTHEL, OF DETROIT, MICHIGAN.

PISTON.

1,224,999.

Specification of Letters Patent.    Patented May 8, 1917.

Application filed August 31, 1914. Serial No. 859,273.

*To all whom it may concern:*

Be it known that I, OLIVER E. BARTHEL, a citizen of the United States of America, residing at Detroit, in the county of Wayne and State of Michigan, have invented certain new and useful Improvements in Pistons, of which the following is a specification, reference being had therein to the accompanying drawings.

My invention aims to provide a novel piston that can be advantageously used in connection with air pumps, compressors and the cylinders of various structures, without using packing rings and similar devices to insure a non-leakable connection between the wall of a cylinder and the periphery of a piston.

With this end in view, my invention further aims to provide a piston with expansible ends adapted to snugly engage the walls of a cylinder and prevent the passage of air, lubricant or other fluid between the cylinder walls and the piston. It is in this connection, that my invention has been primarily designed for an air pump utilized for supplying air to pneumatic tires. It is essential in connection with this type of pump to exclude lubricant or other fluids from the air line, and I have found by actual practice that an expansible feather edge in connection with a piston insures a more positive joint than packing and eliminates difficulties incident to the use of the same. I have also found that an annular feather edge at one end of a piston will provide an air tight connection with the cylinder wall and another annular feather edge at the opposite end of the piston a lubricant seal that prevents the passage of lubricants from one end of the piston to the other. It is also possible to locate the air excluding structures at various points throughout the periphery of the piston and when so disposed tends to dissipate the heat of the piston and preclude any excessive expansion or distortion.

With these and other results in view, reference will now be had to the drawings, wherein—

Figure 1:
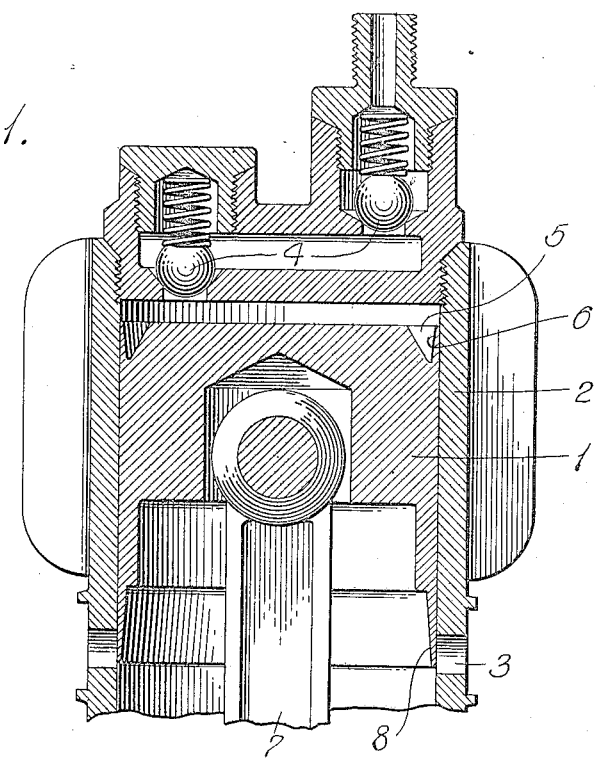
Figure 1 is a vertical sectional view of one form of piston.

Referring first to Fig. 1, the reference numeral 1 denotes a cylindrical piston body reciprocable in a cylinder 2 having air inlet ports 3 and air exhaust ports 4. The air exhaust ports 4 are preferably in a hollow plug or cap closing the end of the cylinder 2 and check valves of the conventional form are utilized for normally closing said ports. The piston body 1 has the outer end thereof provided with an annular groove or recess 5 in proximity to the periphery of the piston body, whereby the outer wall 6 of the groove or recess will present a feather edge against the wall of the cylinder. The groove 5 is substantially V-shape in cross section whereby the inner side of the wall 6 of said groove will be disposed at an acute angle relative to the wall of the cylinder, thus permitting of the groove or recess being in such proximity to the periphery of the piston body as to form an expansible feather edge normally retained in snug engagement with the wall of the cylinder by the partial compression of air therein.

The inner end of the piston body 1 is counterbored to accommodate the end of a connecting rod 7 which is operatably connected to said piston body to reciprocate the piston within the cylinder. When counterboring the inner end of the piston body, the walls of the bore are gradually stepped whereby the inner end of the piston body will terminate in an expansible feather edge 8. This annular feather edge of the piston body snugly engages the walls of the cylinder 2 and besides maintaining a non-leakable or positive seal between the periphery of the body and the cylinder 2, said feather edge serves functionally as a scraper and prevents excessive accumulation of lubricant upon the walls of the cylinder and the possibility of lubricant finding its way to the outer end of the cylinder and entering an air line.

Figure 2:
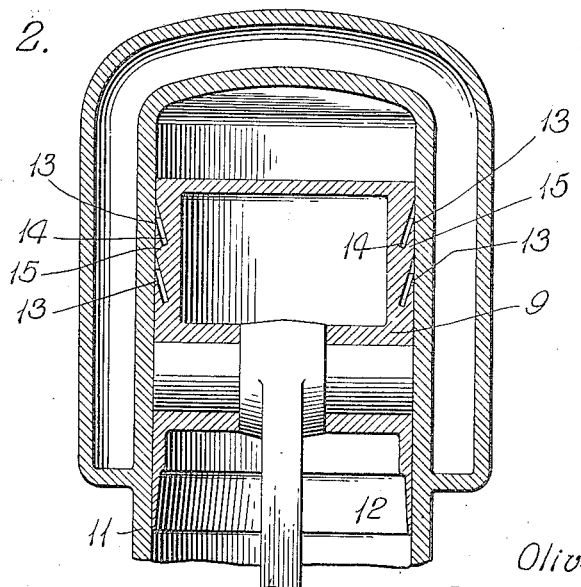
Fig. 2 is a similar view of another form of piston.

In Fig. 2 of the drawing there is illustrated a piston body 9 to which is operatably connected a rod 10 for reciprocating the piston body within a cylinder 11. The inner end of the piston body 9 has an annular feather edge or expansible wall 12 similar to the piston body 1, and coöperating with this expansible wall are annular feather edges 13 adjacent the outer end of the piston body. The annular feather edges 13 are formed by providing the piston body with annular grooves 14 disposed at an angle to the periphery of the piston body, said grooves converging toward the longitudinal axis of the piston body and providing an annular wall 15 within the periphery of the piston body which forms a side of each of the grooves 14, one side of the wall being of a greater depth than the other. The outer edge of the wall 15 is flush with the periphery of the piston body and the feather edges 13 formed by grooving the piston body have the same packing proclivities as the feather edges of the piston body 1. The grooves 14 form annular parallel pockets that tend to dissipate the heat of the piston body and consequently the longevity of the same is materially increased.

In either instance, it will be observed that the piston body has an expansible lubricant excluding skirt or apron surrounding the connecting rod adjacent the connected end thereof, and an air excluding feather edge at the outer end thereof that coöperates with the skirt or apron in forming a positive seal between the piston body and the cylinder.

While in the drawing there is illustrated the preferred embodiments of my invention, it is to be understood that the same are susceptible to such changes as are permissible by the appended claim.

What I claim is:—

The combination with a cylinder and a connecting rod extending therein, of a one piece piston body having a flat outer closed end devoid of connections and protuberances and provided with an annular groove coöperating with the periphery of the piston in forming an expansible air excluding wall having a feather edge in engagement with the wall of said cylinder, said wall having the feather edge thereof in a plane with the end of the piston body, and a bored and interiorly stepped inner end having the inner bored portion thereof connected to said connecting rod and the extreme outer bored portion providing an expansible lubricant excluding skirt terminating in a feather edge in engagement with the wall of the cylinder and coöperating with the feather edge at the outer end of said piston body in providing a positive seal between said piston body and said cylinder.

In testimony whereof I affix my signature in presence of two witnesses.

OLIVER E. BARTHEL.

Witnesses:
ANNA M. DORR,
KARL H. BUTLER.